Patented Aug. 17, 1948

2,447,222

UNITED STATES PATENT OFFICE 2,447,222

METALLIZABLE POLYAZO DYESTUFFS AND A PROCESS FOR THEIR PREPARATION

Walter Wehrli and Charles Petitjean, Basel, Switzerland, assignors to Sandoz Limited, Fribourg, Switzerland, a Swiss firm No Drawing. Application June 29, 1944, Serial No. 542,810. In Switzerland July 2, 1943

5 Claims. (Cl. 260—144)

The present invention relates to new metallizable polyazo dyestuffs dyeing cellulosic fibres in brown shades whose fastness properties can be improved by an after-treatment with metallizing agents, and to a process for their manufacture.

We have found that the new metallizable polyazo dyestuffs of the general formula

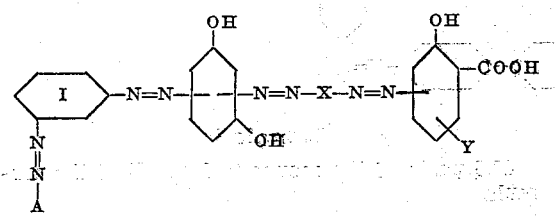

wherein Y stands for a member of the group selected from hydrogen and alkyl, and X stands for a diphenyl radical of the benzidine series, can be obtained by coupling 1 mole of resorcinol with 1 mole of a diazotized aminoazo dyestuff of the general formula

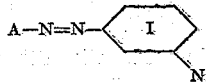

wherein A means the radical of a diazo, diazoazo or coupling component, which radical does not contain diazotizable amino groups or carbon atoms being capable of coupling, and wherein the benzene nucleus I contains one hydroxy group in ortho-position to the amino group, the other free positions of the benzene nucleus I severally carrying a substituent selected from the class consisting of hydrogen, alkyl, nitro, halogen and sulpho groups, and with 1 mole of an intermediate compound prepared by coupling 1 mole of a tetrazotized 4:4'-diaminodiaryl with 1 mole of a 1-hydroxybenzene-2-carboxylic acid.

The polyazo dyestuffs of the above formula can also be obtained by first coupling the resorcinol with 1 mole of the intermediate compound prepared from a 4:4'-diaminodiaryl and a 1-hydroxybenzene-2-carboxylic acid and subsequently coupling the diazo dyestuff thus obtained with the diazotized aminoazo dyestuff of the formula

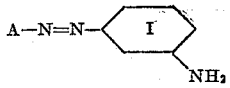

wherein A has the same meaning as above mentioned and wherein the benzene nucleus I contains one hydroxy group in ortho-position to the amino group and may contain further substituents.

The aminoazo dyestuffs of the general formula

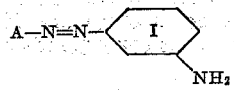

wherein A and I have the signification as described above and which are required for the preparation of the new metallizable polyazo dyestuffs may be produced in several ways. Thus, for instance, diazo or diazoazo compounds containing neither free nor acylated amino groups, nor carbon atoms capable of coupling are coupled with couplable N-acylated 1-hydroxy-2-aminobenzenes or with their derivatives. After saponification of the acylamino group the desired aminoazo dyestuffs will be obtained.

Aminoazo dyestuffs corresponding to the above formula can also be prepared by coupling 1-diazo-3-acylamino-4-hydroxybenzenes or 1-diazo-2-hydroxy-3-acylaminobenzenes or their derivatives with coupling components containing only one group that allows the coupling, but no free or acylated amino groups, and by a subsequent saponification of these products.

The new dyestuffs prepared according to the present process dye cotton and regenerated cellulose fibres in brown shades, the fastness of which can be improved by an after-treatment with metallizing agents. For instance by the after-treatment with copper yielding compounds an important improvement of the light-fastness and of the wet-fastnesses will be reached.

The following examples, without being limitative, illustrate the present invention.

Example 1

22.3 parts of naphthionic acid are diazotized in the usual way and the diazo compound coupled with 15.1 parts of 1-acetylamino-2-hydroxybenzene in presence of 13.3 parts of 30% caustic soda lye, of water and of sodium carbonate. The monoazo dyestuff is then precipitated by means of hydrochloric acid and filtered. The saponification is carried out by heating it with diluted sulphuric acid. The saponified product is then filtered and washed with water. It possesses the probable formula

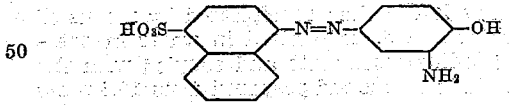

For further diazotization the monoazo dyestuff is dissolved in water in the presence of sodium hydroxide; 7 parts of sodium nitrite are added to the resulting solution, which is then cooled down and allowed to run under good stirring into hydrochloric acid. The diazotization being complete, the coupling is carried out with 11 parts of resorcinol, dissolved in a sodium carbonate solution. The diazo dyestuff thus obtained is precipitated with hydrochloric acid and filtered. It is again dissolved in water in the presence of sodium carbonate and coupled with of benzidine and 13.8 parts of salicyclic acid. The tetrakisazo dyestuff is finally salted out in the warmth and dried. It possesses the probable formula

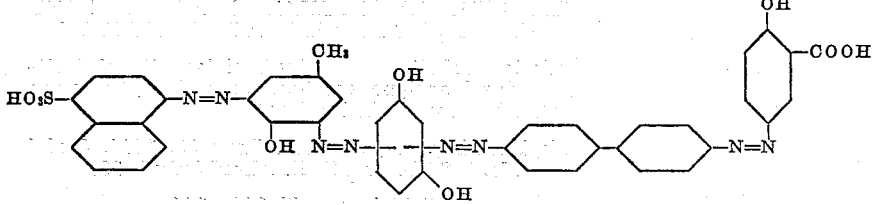

the intermediate compound prepared from 18.4 parts of benzidine and 13.8 parts of salicylic acid. The tetrakisazo dyestuff is then precipitated in the warmth by means of sodium chloride and filtered. It corresponds to the probable formula and dyes cotton in red-brown shades becoming brown after a treatment with copper salts. By this after-treatment the fastness to washing, to light as well as to alkalis becomes largely improved.

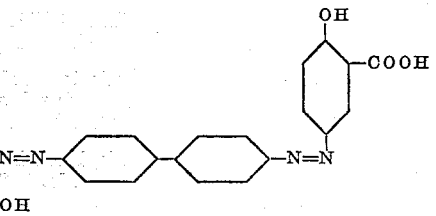

and constitutes, in dry form, a dark powder dyeing cotton in reddish-brown shades. By after-treatment with copper sulphate the dyeings become violetish red-brown, the dyeings possessing then largely improved fastness properties to washing, to light and to acids.

Example 2

22.3 parts of naphthionic acid are diazotized in the usual way and combined with 16.5 parts of 1-methyl-3-acetylamino-4-hydroxybenzene in the presence of 13.3 parts of 30% caustic soda lye, water and sodium carbonate. The monoazo dyestuff is precipitated by means of sodium chloride and saponified by heating during several hours with diluted sulphuric acid. After cooling, the monoazo dyestuff possessing the probable formula

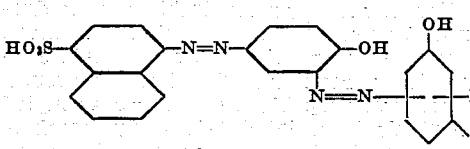

is filtered and washed with water. It is then dissolved in caustic soda lye and water, treated with 7 parts of sodium nitrite and the solution thus obtained is allowed to run, under thoroughly stirring and at low temperature, into diluted hydrochloric acid. When the diazotization has finished, the product is coupled with 11 parts of resorcinol dissolved in a sodium carbonate solution. The disazo dyestuff is then precipitated by means of hydrochloric acid, redissolved in water in presence of sodium carbonate and coupled with the intermediate compound prepared from 18.4 parts

Example 3

42.6 parts of the monoazo dyestuff of the formula

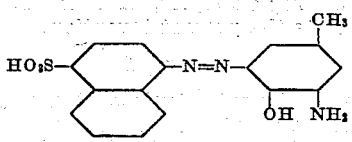

are dissolved in water in the presence of 13.3 parts of 30% caustic soda lye and 7 parts of sodium nitrite are added thereto. This solution is allowed to run, under good stirring and cooling, into hydrochloric acid. The diazotization being complete, the diazo compound is coupled with 15.1 parts of 1-acetylamino-2-hydroxybenzene in presence of 13.3 parts of 30% caustic soda lye, sodium carbonate and water. The disazo dyestuff is then salted out in the warmth and filtered. For the purpose of saponification it is boiled during several hours with 1000 parts of water, 500 parts of ethanol and 100 parts of concentrated sulphuric acid and filtered after having been cooled down. For further diazotization the disazo dyestuff is dissolved in water in presence of caustic soda lye, then 7 parts of sodium nitrite are added thereto and the solution is allowed to run, under good stirring and cooling, into hydrochloric acid. The obtained diazo compound is then coupled with 11 parts of resorcinol dissolved in a sodium carbonate solution. After coupling, the trisazo dyestuff is salted out in the warmth and coupled in a sodium carbonate solution with the intermediate compound prepared from 18.4 parts of benzidine and 13.8 parts of salicylic acid. After complete coupling the pentakisazo dyestuff thus obtained is filtered and dried. It possesses the probable formula

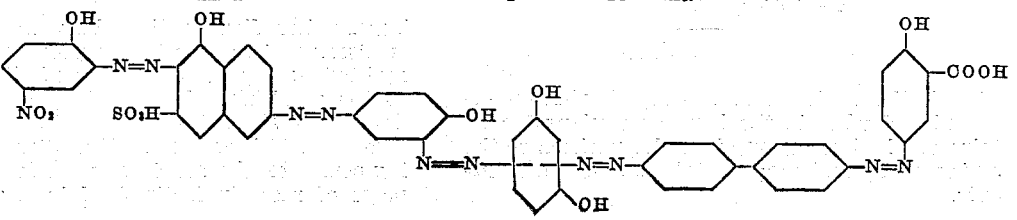

and is, in the dry state, a dark powder dyeing cotton in red-brown shades. After a treatment with copper salts the dyeings become violet-brown and possess considerably improved fastness properties to washing, light, acids and to alkalis.

Example 4

17.3 parts of 1-aminobenzene-4-sulphonic acid are diazotized in the usual way and coupled with 15.1 parts of 1-acteylamino-2-hydroxybenzene in presence of 13.3 parts of 30% caustic soda lye, sodium carbonate and water. The dyestuff is then precipitated by means of hydrochloric acid and saponified by heating the same with diluted sulphuric acid. After cooling down the dyestuff is filtered; for further diazotization it is dissolved in water and caustic soda lye. Then 7 parts of sodium nitrite are added to the solution, the latter is treated in the cold and under good stirring with diluted hydrochloric acid, until the solution produces a blue coloration on Congo red paper. When the diazotization has finished, it is coupled with 11 parts of resorcinol dissolved in a sodium carbonate solution. The disazo dyestuff thus obtained is precipitated by means of hydrochloric acid, filtered and redissolved in water and sodium carbonate. It is coupled in the usual manner with the intermediate product prepared from 21.2 parts of 3:3'-tolidine and 15.2 parts of 1-methyl-2-hydroxy-3-benzoic acid. The tetrakisazo dyestuff thus obtained is salted out in the heat, filtered and dried. It probably possesses the formula

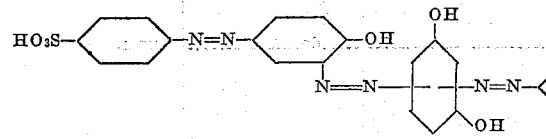

and is a dark powder dyeing cotton in red-brown shades. After a treatment with copper salts, the dyeings become violetish red-brown and possess then largely improved fastness properties to washing, light, acids and to alkalis.

Example 5

The diazo compound prepared in the usual way from 22.3 parts of naphthionic acid is coupled with 23.1 parts of 1-acetylamino-2-hydroxybenzene-5-sulphonic acid in presence of sodium bicarbonate, water and pyridine. After the coupling has finished, the pyridine is blown off by means of steam and the monoazo dyestuff is precipitated by means of hydrochloric acid and sodium chloride. By heating with diluted sulphuric acid it becomes saponified and after cooling the same can be filtered off. The monoazo dyestuff is then dissolved in water and caustic soda lye and, after addition of 7 parts of sodium nitrite, the solution is treated under cooling and good stirring with hydrochloric acid until Congo acid reaction has been reached. When the diazotization has finished, the mixture is coupled with 11 parts of resorcinol dissolved in a sodium carbonate solution. The disazo dyestuff is then precipitated by means of hydrochloric acid and sodium chloride and coupled in presence of sodium carbonate with the intermediate product prepared from 18.4 parts of benzidine and 13.8 parts of salicylic acid. The tetrakisazo dyestuff is then precipitated in the warmth by addition of sodium chloride, filtered and finally dried. It corresponds to the probable formula

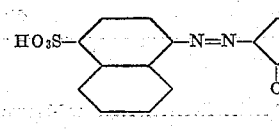 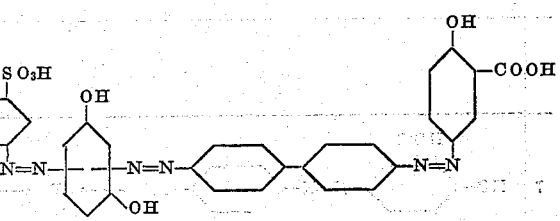

and dyes cotton in brown shades which become violetish-brown after a treatment with copper salts. This after-treatment improved largely the fastness to washing, light, acids and to alkalis.

Example 6

16.6 parts of 1-amino-3-acetylamino-4-hydroxybenzene are diazotized in the presence of 6.9 parts of sodium nitrite in a hydrochloric acid solution under cooling and coupled in presence of sodium carbonate with 25.6 parts of 1-phenyl-3-methylpyrazolone-4'-sulphonic acid. The dyestuff is salted out and filtered. By heating the same with diluted sulphuric acid the acetyl group is split off. The saponified monoazo dyestuff is dissolved in water by adding 4 parts of 30% caustic soda lye, then 6.9 parts of sodium nitrite are added thereto and the whole is allowed to run at about 5° C. into diluted hydrochloric acid. After completion of the diazotization the suspension of the diazo compound is coupled with 11 parts of resorcinol which has been dissolved in a sodium carbonate solution. After coupling the disazo dyestuff is salted out, filtered, dissolved in water in the presence of sodium carbonate and coupled with the intermediate product prepared from 18.4 parts of benzidine and 13.8 parts of salicylic acid. The tetrakisazo dyestuff is then salted out, filtered and eventually purified by redissolving and by subsequent precipitation. It corresponds to the probable formula

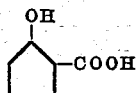
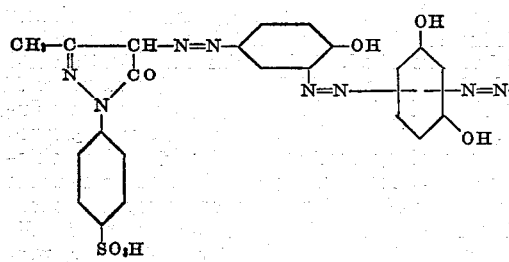

and is, in the dry state, a dark powder dyeing cotton in yellowish-brown shades. By an after-treatment with copper salts the dyeings are largely improved in their fastnesses to light and to washing.

Further examples are enumerated in the following table, wherein R stands for resorcinol and A stands for the one side coupled monoazo dyestuff obtainable from 1 mole of tetrazotized benzidine and 1 mole of salicylic acid.

| | | Dyeing on cotton | |
|---|---|---|---|
| | | direct | after coppered |
| 7 | (structure) → R ← A | red-brown | violetish-brown. |
| 8 | (structure) → R ← A | violet-brown | violetish-dark-brown. |
| 9 | (structure) → R ← A | dark-brown | black-brown. |
| 10 | (structure) → R ← A | red-brown | violetish-brown. |
| 11 | (structure) → R ← A | do | brown. |
| 12 | (structure) → R ← A | brown | Do. |
| 13 | (structure) → R ← A | red-brown | violetish-brown. |
| 14 | (structure) → R ← A | do | Do. |
| 15 | (structure) → R ← A | do | Do. |

| | | Dyeing on cotton | |
| --- | --- | --- | --- |
| | | direct | after coppered |
| 16 | HO₃S-◯-N=N-◯-N=N-◯(NH₂)-OH → R ← A | brown | brown. |
| 17 | HO₃S-◯-N=N-◯(OH)(SO₃H)-N=N-◯(NH₂)-OH → R ← A | violetish-brown | violetish-brown. |
| 18 | HO₃S-◯-N=N-◯(SO₃H)-N=N-◯(NH₂)-OH → R ← A | dark brown | Do. |
| 19 | NaOOC-◯(HO)-N=N-◯(NH₂)-OH → R ← A | brown | brown. |
| 20 | SO₃Na-◯(SO₃Na)-N=N-◯(NH₂)-OH → R ← A | do | Do. |
| 21 | HOOC-◯(HO)-N=N-◯(NO₂)(OH)(NH₂) → R ← A | do | Do. |
| 22 | HOOC-◯(HO)-N=N-◯(Cl)(NH₂)-OH → R ← A | do | Do. |

What we claim is:
1. A metallizable polyazo dyestuff of the formula

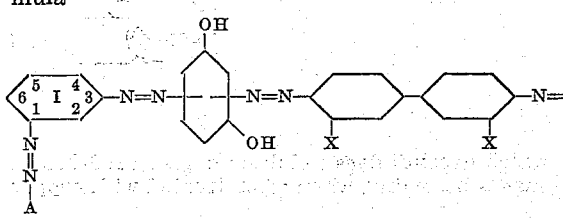

wherein X represents a member selected from the group consisting of hydrogen and methyl, Y represents a member selected from the group consisting of hydrogen and methyl, A represents a radical which is free from diazotizable amino groups and contains no carbon atoms capable of coupling, the radical A being selected from the group consisting of radicals of the benzene, naphthalene and pyrazolone series, the benzene nucleus I containing one hydroxy group in ortho-position to the azo group which is at the 3-position, the other free positions of the benzene nucleus I severally carrying a substituent selected from the class consisting of hydrogen, alkyl, nitro, halogen and sulfo.

2. A metallizable polyazo dyestuff of the formula

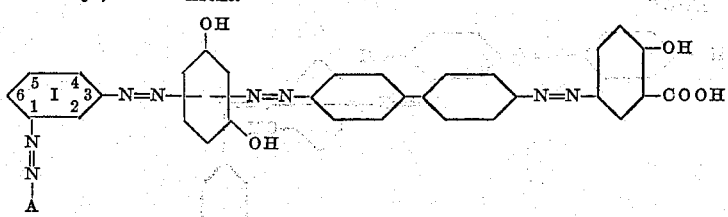

wherein A represents a radical which is free from diazotizable amino groups and contains no carbon atoms capable of coupling, the radical A being selected from the group consisting of radicals of the benzene, naphthalene and pyrazolone series, the benzene nucleus I containing one hydroxy group in ortho-position to the azo group which is at the 3-position, the other free positions of the benzene nucleus I severally carrying a substituent selected from the class consisting of hydrogen, alkyl, nitro, halogen and sulfo.

3. The new metallizable polyazo dyestuff of the formula

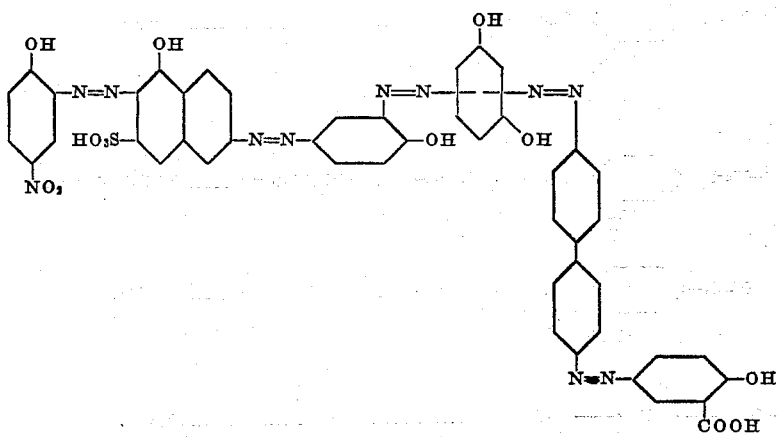

which dyestuff dyes cellulosic fibres in red-brown shades becoming, when after-treated with copper compounds, violet-brown with improved fastness properties.

4. The new metallizable polyazo dyestuff of the formula

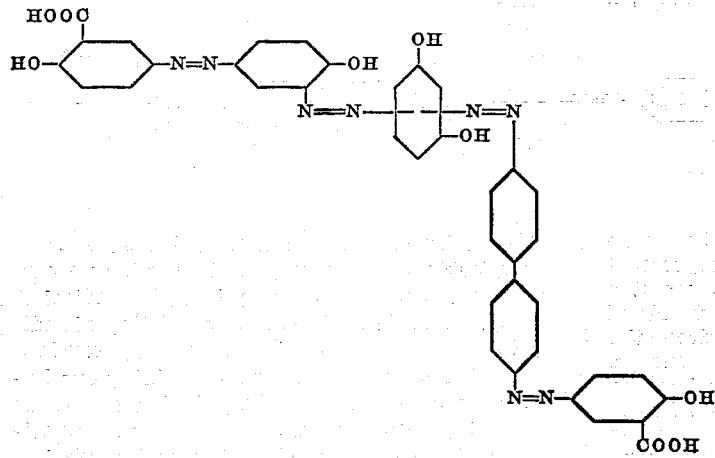

which dyestuff dyes cellulosic fibres in brown shades becoming, when after-treated with copper compounds, improved in their fastness properties.

5. The new metallizable polyazo dyestuff of the formula

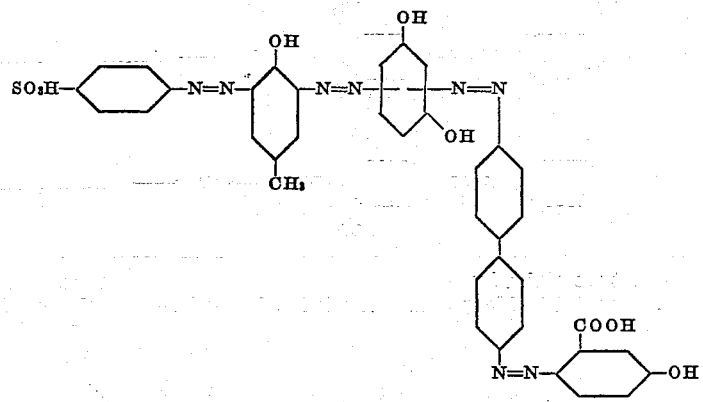

which dyestuff dyes cellulosic fibres in red-brown shades becoming, when after-treated with copper compounds, brown with improved fastness properties.

WALTER WEHRLI.
CHARLES PETITJEAN.

REFERENCES CITED

The following references are of record in the file of this patent:

UNITED STATES PATENTS

| Number | Name | Date |
|---|---|---|
| 399,581 | Strasburger | Mar. 12, 1889 |
| 2,226,675 | Straub et al. | Dec. 31, 1940 |

FOREIGN PATENTS

| Number | Country | Date |
|---|---|---|
| 5,746 | Great Britain | 1898 |